United States Patent [19]

Hernandez

[11] Patent Number: 4,873,612
[45] Date of Patent: Oct. 10, 1989

[54] TEMPERATURE STABLE MULTILAYER CAPACITOR

[75] Inventor: Jorge M. Hernandez, Mesa, Ariz.

[73] Assignee: Rogers Corporation, Rogers, Conn.

[21] Appl. No.: 226,601

[22] Filed: Aug. 1, 1988

[51] Int. Cl.$^4$ ............................ H01G 1/00; C23B 5/50
[52] U.S. Cl. ....................................... 361/321; 29/25.42
[58] Field of Search ................... 252/62.2; 264/61, 63, 264/65; 501/134–139; 29/25.42; 174/68.5; 357/10; 361/328, 330, 320, 306, 321

[56] References Cited

U.S. PATENT DOCUMENTS

| | | | |
|---|---|---|---|
| 3,549,415 | 12/1970 | Capek et al. | 29/25.42 X |
| 3,694,710 | 9/1972 | Kirschner | 361/321 C |
| 4,027,209 | 5/1977 | Maher | 29/25.42 X |
| 4,086,649 | 4/1978 | Hanold | 361/321 C |

FOREIGN PATENT DOCUMENTS 140871  4/1980  German Democratic Rep. .
40737  12/1979  Japan ............................ 361/321 CC Primary Examiner—Donald A. Griffin
Attorney, Agent, or Firm—Fishman, Dionne & Cantor

[57] ABSTRACT

The temperature characteristics of each of the layers in a multilayer ceramic capacitor are adjusted (through chemical doping of the basic dielectric material) to thereby stagger the temperature characteristics (e.g. curie points). As a result, the composite temperature characteristic of the multilayer structure will be much more stable than that of any individual layer. The temperature characteristics of the individual layers will combine in an additive manner thereby achieving the objective of high capacitance and uniform temperature stability for materials which have high dielectric constant but poor temperature stability. Thus, by properly formulating the composition of the layers of a multilayer ceramic chip capacitor, relative temperature stability of capacitance and high volumetric capacitance efficiency will be achieved.

24 Claims, 4 Drawing Sheets

TEMPERATURE STABLE MULTILAYER CAPACITOR

BACKGROUND OF THE INVENTION

This invention relates generally to multilayer capacitor chips. More particularly, this invention relates to multilayer ceramic capacitors having a high dielectric constant and which are relatively uniform with respect to changing temperature.

It is well known that typical ceramic dielectrics (such as Class II dielectrics as defined by the Electronic Industries Association, EIA) have dielectric constants which undergo change with respect to temperature. Typically, the temperature stability or TC curve is bell shaped. A typical TC curve for such a prior art ceramic material is shown in FIG. 1. It is clear from a review of FIG. 1 that the dielectric constant (and capacitance) of a ceramic material varies greatly with temperature. The temperature at which the dielectric constant is a maximum is termed the curie point.

As a result of the phenomenon associated with known ceramic materials illustrated in FIG. 1, ceramic capacitor manufacturers have attempted to develop ceramic dielectric materials with both higher dielectric constants and better temperature stability characteristics. Unfortunately, this approach has been difficult since the present dielectric materials used in multilayer ceramic chip capacitors (for any given layer) inherently have two mutually exclusive characteristics including either good temperature stability and relatively low capacitance (X7R); or relatively poor temperature stability and very high capacitance (Z5U). A ceramic dielectric material having both uniform temperature stability and high dielectric constant is presently not known to applicant.

The ceramic industry has labeled relatively stable temperature characteristic curves for ceramics as X7R type ceramics. One common method of achieving X7R temperature stable curves is to combine a high purity ceramic such as Barium Titanate with a number of known dopants.

Unfortunately, this method suffers from certain drawbacks. For example, modifying pure Barium Titanate with dopants to achieve better temperature stability characteristics leads to lower dielectric constants than are available with the unmodified Barium Titanate.

In many applications, it has become increasingly important and desirable to have the temperature stability of an X7R material, but with a much higher dielectric constant such as found in a Z5U dielectric. Such applications include decoupling of the newer highly dense memory integrated circuits and other VLSI devices which handle high currents at high switching speeds. Still other applications include decoupling in oil drilling equipment, aerospace and military applications where temperature stability is vital.

SUMMARY OF THE INVENTION

The above discussed and other problems and deficiencies of the prior art are overcome or alleviated by the temperature stable multilayer ceramic capacitor chip of the present invention. In accordance with the present invention, the temperature characteristics of each of the layers in a multilayer ceramic capacitor are adjusted (through chemical doping of the basic dielectric material) to thereby stagger the temperature characteristics (e.g. Curie points). As a result, the composite temperature characteristic of the multilayer structure will be much more stable than that of any individual layer. The temperature characteristics of the individual layers will combine in an additive manner thereby achieving the objective of high capacitance (e.g. greater than 10,000 DK) and uniform temperature stability for materials which have high dielectric constant but poor temperature stability.

Thus, by properly formulating the composition of the layers of a multilayer ceramic chip capacitor, relative temperature stability of capacitance and high volumetric capacitance efficiency will be achieved.

The above discussed and other advantages and features of the present invention will be apparent to and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
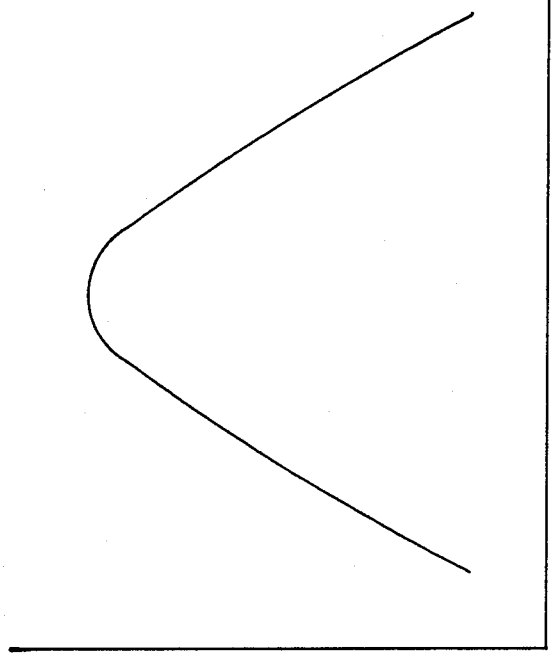
FIG. 1 is a diagram showing dielectric constant versus temperature for a typical ceramic dielectric material.

Referring first to FIG. 1, a temperature stability or TC curve for a common Class II ceramic dielectric is shown exhibiting a well known bell shaped configuration. Thus, while a selected ceramic dielectric material may have a sufficiently high dielectric constant (DK) at a given temperature or temperature range (with the highest DK occurring at its curie point), the dielectric constant will change drastically as the temperature either increases or decreases. This is particularly problematic when the dielectric is used in electronic equipment which undergoes even a minor amount of temperature variation.

Figure 2:
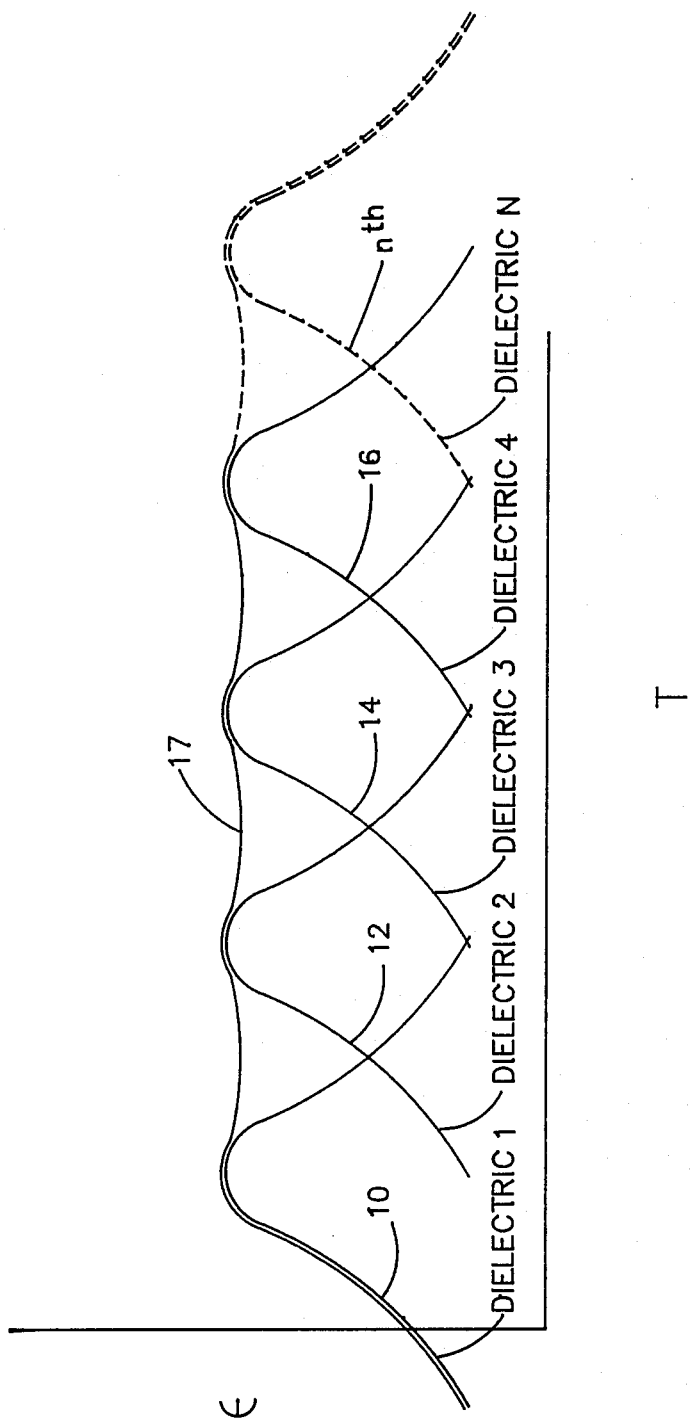
FIG. 2 is a curve of dielectric constant versus temperature for a multilayer ceramic capacitor chip in accordance with the present invention.

Referring now to FIG. 2, the present invention attempts to use the well known phenomenon of FIG. 1 in a manner which overcomes the drawback of that phenomenon. Thus, as shown in FIG. 2, the present invention employs a plurality of layers of ceramic dielectric material with each of the layers having TC curves peaking at different (staggered) temperatures so that the effective TC curve will be substantially flat. In FIG. 2, four curves of four different dielectrics are identified at 10, 12, 14 and 16. Each of these dielectric materials have substantially similar Curie points occurring at differing temperatures. A fifth dielectric is identified in dotted lines and is intended to indicate an nth dielectric. Thus, any number of dielectric materials having differing Curie points may be used to form an effective TC curve 17 of substantially constant dielectric constant over a very large temperature range. If the dielectric constant chosen is a high dielectric constant, then the resultant multilayer capacitive element will have an extremely high capacitance over an extremely large temperature range.

Figure 3:
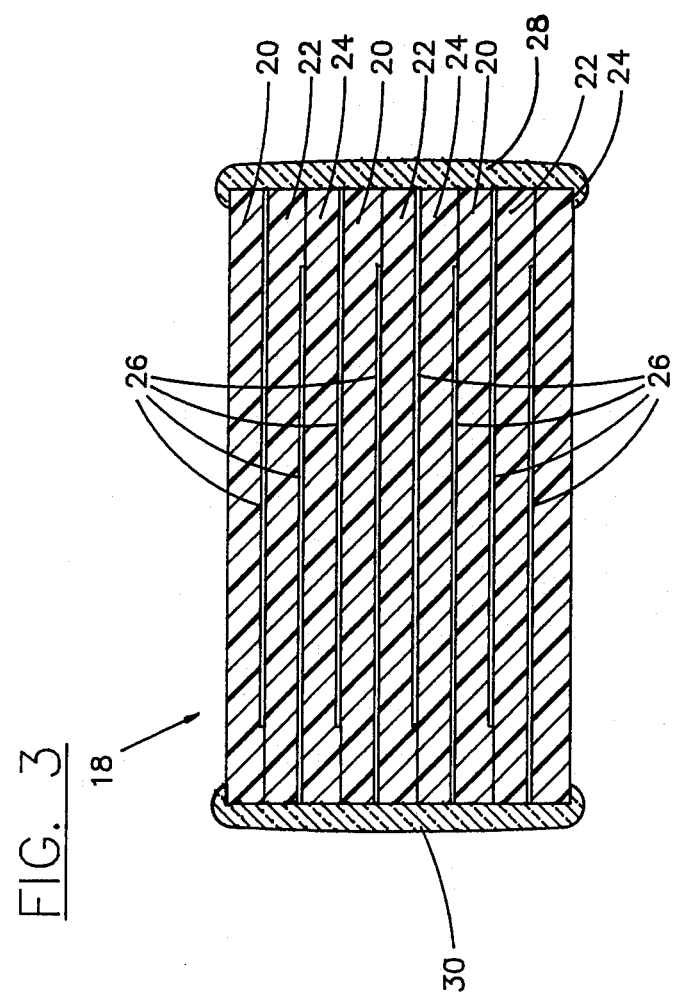
FIG. 3 is a cross sectional elevation view of a multilayer ceramic capacitor chip in accordance with the present invention.

In FIG. 3, an example of a multilayer capacitive chip in accordance with the present invention is shown generally at 18. Capacitor chip 18 is comprised of alternating layers of ceramic dielectric material of different curie points. In the embodiment shown at 18, three dielectric materials 20, 22 and 24 are stacked in three alternating groups. In addition, and in a known fashion, electrodes 26 are interleaved between the layers of dielectric with alternating electrodes 26 being exposed at respective end termination 28 and 30 to define a well known multilayer ceramic chip.

Multilayer capacitor chip 10 of FIG. 3 may be manufactured by obtaining known high dielectric constant ceramic material such as Barium Titanate, Lead Magnesium Niobate, etc. and using well known techniques to change the Curie temperature of the ceramic by adding dopants to the basic dielectric material. The technique for altering the curie temperature of a ceramic material or relaxor body is described, for example, in "Electronic Ceramics" edited by Lionel M. Levinson, Marcel Dekker (1987, pages 202-213. The final multilayer ceramic capacitor will thus use alternate layers of dielectric with different temperature characteristics (Curie points) staggered in such a way so that the composite TC curve looks like a X7R material, but has the advantage of having high dielectric constant of a Z5U relaxor dielectric or a Z5U Barium Titanate dielectric.

Figure 4:
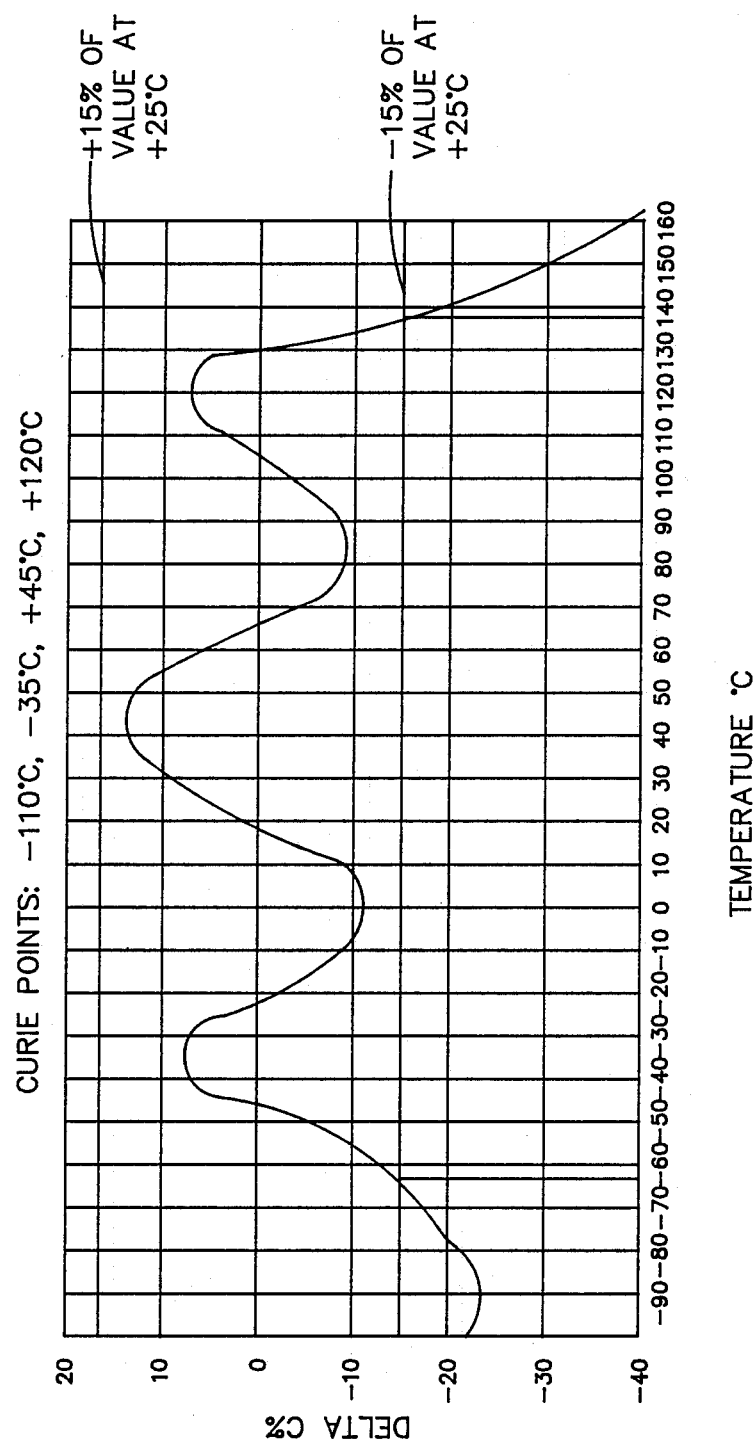
FIG. 4 is a composite curve of change in capacitance versus temperature using a multilayer ceramic capacitor chip employing four different dielectrics in accordance with the present invention.

FIG. 4 depicts a composite curve for a multilayer capacitor chip of the type shown in FIG. 3 utilizing four dielectrics with curie points of $-110°$ C., $-35°$ C., $+45°$ C. and $120°$ C., respectively. The dielectrics chosen were made of lead magnesium niobate having dopants added thereto to change the curie points accordingly. The result is a temperature curve which is relatively stable from between $-63°$ C. and $137°$ C. with a C which is within plus or minus 15% of its value at $+25°$ C. Using lead magnesium niobate as the dielectric, the resultant multilayer capacitor chip would have a relatively high dielectric constant of 15,000 over a relatively large temperature range of almost $200°$ C.

In addition to improved temperature stability, the multilayer ceramic capacitors of the present invention also offer improved volumetric capacitance efficiency. In other words, the physical size of a multilayer capacitor employing known temperature stable dielectrics would have to be far larger than a multilayer capacitor in accordance with this invention for a given high capacitance value. For example,, a X7R MLC capacitor (with DK of about 4500) made from a prior art temperature stable dielectric would have to be about four to six times as large as a MLC having the same capacitance values which has been made in accordance with the method of the present invention. It will be appreciated that large MLC capacitors are not desirable in modern day digital circuitry where miniaturization is stressed.

Of course, it will be appreciated that while a particular MLC configuration has been shown in FIG. 3, that MLC is by example only. Thus, in accordance with the present invention, the number of dielectric layers, the number of differing dielectrics and the groupings thereof may be varied and tailored to specific applications. Also, the MLC configuration could be of other known types such as the MLC's depicted in FIGS. 4 and 10 of U.S. Pat. No. 4,748,537 and FIGS. 11-16 of U.S. Pat. No. 4,706,162 (both of which are assigned to the assignee hereof and incorporated herein by reference).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a multilayer capacitor including a plurality of layers of dielectric material having interleaved layers of electrodes with alternating electrodes layers being electrically connected to one of a pair of respective common terminations, the improvement comprising:
   at least two of said plurality of layers of dielectric material being comprised of dielectric materials having differing Curie points wherein said at least two layers will have mutually distinct Curie points which are staggered over a preselected temperature range and wherein said at least two layers will form an effective temperature characteristic curve which is substantially constant over said preselected temperature range and wherein said at least two layers will have an effective dielectric constant which will be substantially equal to the dielectric constants at said Curie points.

2. The multilayer capacitor of claim 1 wherein:
   said plurality of layers of dielectric material having differing and staggered Curie points are arranged in alternating groups.

3. The multilayer capacitor of claim 1 wherein:
   said dielectric materials have a dielectric constant of at least 10,000.

4. The multilayer capacitor of claim 1 wherein:
   said plurality of layers of dielectric materials have substantially equal dielectric constants.

5. The multilayer capacitor of claim 4 wherein:
   said dielectric materials have a dielectric constant of at least 10,000.

6. The multilayer capacitor of claim 1 wherein:
   said dielectric materials comprise at least one relaxor dielectric.

7. In a multilayer capacitor including a plurality of layers of dielectric material having interleaved layers of electrodes with alternating electrode layers being electrically connected to one of a pair of respective common terminations, the improvement comprising:
   a first of said plurality of layers of dielectric material having a first Curie point;
   a second of said plurality of layers of dielectric material having a second Curie point; and
   wherein said first and second Curie points are mutually distinct and staggered over a preselected temperature range and wherein said first and second layers will form an effective temperature characteristic curve which is substantially constant over said preselected temperature range and wherein said first and second layers will have an effective dielectric constant which will be substantially equal to the dielectric constants at said Curie points.

8. The multilayer capacitor of claim 7 wherein:
   said plurality of layers of dielectric material having differing and staggered Curie points are arranged in alternating groups.

9. The multilayer capacitor of claim 7 wherein:
   said dielectric materials have a dielectric constant of at least 10,000.

10. The multilayer capacitor of claim 7 wherein:
said plurality of layers of dielectric materials have substantially equal dielectric constants.

11. The multilayer capacitor of claim 10 wherein:
said dielectric materials have a dielectric constant of at least 10,000.

12. The multilayer capacitor of claim 7 wherein:
said dielectric materials comprise at least one relaxor dielectric.

13. A method of making a multilayer capacitor including a plurality of layers of dielectric material having interleaved layers of electrodes with alternating electrode layers being electrically connected to one of a pair of respective common terminations comprising the steps of:
forming at least two of said plurality of layers of dielectric material from dielectric materials having differing Curie points wherein said at least two layers will have mutually distinct Curie points which are staggered over a preselected temperature range and wherein said at least two layers will form an effective temperature characteristic curve which is substantially constant over said preselected temperature range and wherein said at least two layers will have an effective dielectric constant which will be substantially equal to the dielectric constants at said Curie points.

14. The method of claim 13 including:
arranging said plurality of layers of dielectric material having differing and staggered Curie points into alternating groups.

15. The multilayer capacitor of claim 13 wherein:
said dielectric materials have a dielectric constant of at least 10,000.

16. The multilayer capacitor of claim 13 wherein:
said plurality of layers of dielectric materials have substantially equal dielectric constants.

17. The multilayer capacitor of claim 16 wherein:
said dielectric materials have a dielectric constant of at least 10,000.

18. The method of claim 13 wherein:
said dielectric materials comprise at least one relaxor dielectric.

19. A method of making a multilayer capacitor including a plurality of layers of dielectric material having interleaved layers of electrodes with alternating electrode layers being electrically connected to one of a pair of respective common terminations, the improvement comprising the steps of:
forming a first of said plurality of layers of dielectric material with a first Curie point;
forming a second of said plurality of layers of dielectric material with a second Curie point wherein said first and second Curie points are mutually distinct and staggered over a preselected temperature range and wherein said first and second layers will form an effective temperature characteristic curve which is substantially constant over said preselected temperature range and wherein said first and second layers will have an effective dielectric constant which will be substantially equal to the dielectric constants at said Curie points.

20. The method of claim 19 including:
arranging said plurality of layers of dielectric material having differing and staggered Curie points in alternating groups.

21. The method of claim 19 wherein:
said dielectric materials have a dielectric constant of at least 10,000.

22. The method of claim 19 wherein:
said plurality of layers of dielectric materials have substantially equal dielectric constants.

23. The method of claim 19 wherein said forming steps comprise:
doping said first and second layers of dielectric material.

24. The method of claim 19 wherein:
said dielectric materials comprise at least one relaxor dielectric.

* * * * *